United States Patent [19]

Schwaemmle

[11] Patent Number: 4,793,261

[45] Date of Patent: Dec. 27, 1988

[54] ACCUMULATING PALLET CHAIN-DOG CONVEYOR AND METHOD OF CONVEYING PALLETS

[75] Inventor: Kurt W. Schwaemmle, Belleville, Mich.

[73] Assignee: Durr Industries, Inc., Plymouth, Mich.

[21] Appl. No.: 13,482

[22] Filed: Feb. 11, 1987

[51] Int. Cl.⁴ .................. B61B 10/00; B65G 17/00
[52] U.S. Cl. .................. 104/172.3; 104/252; 104/172.5; 198/803.01; 198/345
[58] Field of Search ............ 104/165, 172.1, 172.3, 104/172.5, 229, 231, 233, 249–252, 254; 198/803.01, 465.1, 345

[56] References Cited

U.S. PATENT DOCUMENTS

| | | | |
|---|---|---|---|
| 2,619,916 | 12/1952 | Rainier | 104/249 X |
| 3,767,025 | 10/1973 | Louis | 104/209 X |
| 3,805,947 | 4/1974 | Ward | 198/803.01 |
| 4,408,540 | 10/1983 | Dehne | 104/172.3 |
| 4,461,216 | 7/1984 | Carney | 104/172.3 |
| 4,650,061 | 3/1987 | Hasenwinkle et al. | 198/465.1 X |

FOREIGN PATENT DOCUMENTS 135816  1/1961  U.S.S.R. .................. 104/172.3

*Primary Examiner*—Paul F. Neils
*Attorney, Agent, or Firm*—Cullen, Sloman, Cantor, Grauer, Scott & Rutherford

[57] ABSTRACT

An accumulating pallet chain-dog conveyor has spring-biased roller assemblies attached to the pallet underside for frictionally engaging dogs and spacers which are connected to an endless chain. The roller assemblies include rotatable rollers having a plurality of flats for engaging the surfaces of the dogs and spacers. In operation, the pallets are propelled by the dogs which are engaged by the spring-biased rollers. The conveyor includes a pallet stop which halts the forward movement of the pallet at a predetermined position. When the forward movement of the pallet is stopped, the opposed rollers rotate the distance of one flat whereby the dog passes between the rollers in sliding, frictional engagement therewith. Thus, the pallet stops and the endless chain with its attached dogs and spacers continues to move. After the dog passes from between the opposed rollers, the rollers slidingly, frictionally engage a spacer which also passes between the rollers. The sliding, frictional engagement with the dogs and the spacers during the time in which the pallet is stationary due to its engagement with the pallet stop prevents rearward and lateral movement of the pallet. In another aspect, the conveyor includes a pallet-propelling sprocket in synchronous motion with the endless chain and a plurality of sprocket-receiving pins mounted on the underside of the pallet. The conveyor includes a drive course and return course linked by turn courses. As a pallet reaches the end of the drive course or the end of the return course, the pallet-driving sprocket engages the pins whereby the pallet is carried through the turn course.

11 Claims, 3 Drawing Sheets

ACCUMULATING PALLET CHAIN-DOG CONVEYOR AND METHOD OF CONVEYING PALLETS

FIELD OF INVENTION

The present invention relates generally to conveyors and conveying systems and more particularly to accumulating pallet chain-dog conveyors and their methods of use.

BACKGROUND OF THE INVENTION

Since the advent of the assembly line, conveyors and methods of conveying a workpiece through a series of stations have been instrumental in manufacturing processes. Numerous classes of conveyors exist, including overhead conveyors, such as trolley conveyors and power-and-free conveyors, flight conveyors, screw conveyors and the like. Most include one or more continuouslydriven chain and carrier attachments defining a drive course and a return course. The carrier attachments or tracks which guide the wheels or a carrier such as a wheeled pallet may be an open beam, semi-enclosed channel or a combination of these structures. Vertical track bends typcially link the drive and return courses through which the carrier may be propelled by rotating paddles.

One specific type of conveyor, known in the art as an accumulating pallet chain-dog conveyor, includes a power-driven endless chain to which longitudinally spaced pusher dogs or other devices are attached. The dogs are adapted for operative pushing engagement with an assembly which is attached to the underside of a pallet for advancing the pallet along the drive and return courses. In conveyors of this type, a single endless chain, centrally disposed with respect to the dog-engaging pallet assembly, continuously moves through the drive course and the return course. The dog-engaging assembly on the underside of the pallet engages one of the dogs and is thereby carried through the conveyor course. A pallet stop is provided which, when activated, engages the pallet, halting its movement through the drive course. The dog-engaging assembly on the underside of the pallet release the dog in response to the pallet's engagement with the pallet stop. Additional pallets then accumulate behind the first or primary stopped pallet in the same fashion until the pallet stop is retracted. Each dog-engaging pallet assembly in turn then reengages a passing dog whereby the flow of the pallets through the drive course is reestablished.

The chain-dogs, or "dogs", which are attached to the endless chain are longitudinally spaced with a plurality of chain-spacers or "spacers" being attached to the endless chain between the dogs. Thus, in operation at a given point in the conveyor course a dog passes followed by a plurality of spacers with another dog following the spacers in a continuous manner. Each dog has a front or leading portion which is expanded laterally such that the dog resembles a wedge. In accumulating pallet chain-dog conveyors, the dog-enegaging assembly on the underside of each pallet includes a pair of opposed, spring-biased circular rollers which, when a dog passes therebetween, engages the leading, expanded portion of the dog such that the dog carries the pallet through the course. When the forward movement of the pallet is stopped by a pallet stop, the continued forward movement of the dog causes the rollers to release the dog, whereby the spacers then move freely through the space between the opposed rollers. In these conventional conveyor systems, as the dogs move out of engagement with the opposed rollers, a space exists between the opposed rollers and the spacers such that there is no engagement therebetween. That is, the spacers are free to move between the rollers without providing any contact whatsoever between the rollers and the spacers. As the next dog approaches the stationary pallet, the leading edge of the dog engages the opposed rollers which then move apart, allowing the dog to pass therethrough, and once again the spacers which follow the dog pass freely between the opposed rollers.

This conventional arrangement has several disadvantages. Most notably, when the pallet first engages the pallet stop and releases the dog, the pallet is freely positioned on the track. There is therefore a corresponding rearward movement of the pallet in response to its impact with the pallet stop and the release of the dog. In the past, in order to prevent this unwanted rearward movement of the pallet, it was necessary to provide a second pallet stop to engage the rearward end of the pallet. Hence, as the pallet engaged the forward pallet stop it started to "bounce back" on the track whereupon it then engaged the rearward pallet stop so that the rearward movement of the pallet on the track did not continue. However, this rearward pallet stop still allowed some rearward movement of the pallet, making it difficult to precisely position the pallet and thus the workpiece which it carries. It is known that precise positioning of the workpiece is necessary in many automated manufacturing processes. For example, where the operation on the workpiece is performed by robots, precise positioning of the workpiece by the pallet is generally required. Therefore, this pallet movement between the pallet stops or "chatter" is highly undesirable.

It is also known that in conventional accumulating pallet chaindog conveyors, the pallets are propelled through the turn course by a rotating paddle which engages the bottom of the pallet at the ends of the drive course and return course. Often, a pallet which reached the end of the drive course remained there a period of time until the paddles rotated into position for engagement with the pallet. In these devices, the paddles typically comprised two radial spokes. Thus, in those instances where a pallet had to wait for the next spoke, valuable processing time was lost.

Therefore, it would be desirable to provide an accumulating pallet chain-dog conveyor which does not need a rearward pallet stop and which eliminates pallet chatter. It would also be desirable to provide such an accumulating pallet chain-dog conveyor in which the pallets are immediately propelled through the turn course without unduly awaiting the next spoke.

I have discovered such an accumulating pallet chain-dog conveyor and a method of conveyance which achieves these goals.

SUMMARY OF THE INVENTION

In accordance with the present invention, an accumulating pallet chain-dog conveyor is provided which includes a conveyor assembly having a drive course through which a pallet is carried by an endless propelling means such as a chain. Attached to the endless propelling means are a plurality of wedge-shaped dogs which are spaced by a plurality of spacers interposed between the dogs and also attached to the endless propelling means. The conveyor includes a carrier attachment and a plurality of pallets for conveying workpieces through the drive course. On the underside of each pallet there is provided two horizontally opposed rollers attached to pivoting arms, the rollers being biased toward each other such that the rollers engage both the dogs and the spacers. Each roller is provided with a series of flats to obtain greater surface area contact between the rollers and the dogs or spacers. In operation, the opposed rollers engage the leading edge of the wedge-shaped dog and remain in the engaged position to propel the pallet through the drive course. The conveyor also includes a pallet stop for engaging a pallet that halts the pallet's movement through the drive course. The two horizontally opposed rollers are arranged and biased such that as the pallet's forward movement is halted by the pallet stop, the dog moves between the two horizontally opposed rollers while maintaining sliding, frictional engagement between the rollers and the dog. After the dog completes its movement between the rollers, the spacers then sequentially move between the rollers in sliding, frictional engagement with the rollers. The sliding, frictional engagement of the opposed rollers with the dog and, thereafter, with the spacers, imparts a forward force on the pallet such that the pallet is substantially rigidly held against the pallet stop so that at no time does the pallet move rearwardly relative to the pallet stop.

The present invention also provides in another aspect a plurality of pins in a pin assembly or sections of chain which are mounted on the underside of the pallet such that sprocket receiving gaps are defined between the pins or by the chain links. In this embodiment, the conveyor includes at least one pallet carrying sprocket preferably in synchronous movement with the endless propelling means. The pallet is carried through each turn course by the pallet carrying sprocket, the teeth of which mesh with the pin assemblies or the chain sections.

These and other objects, advantages and features of the present invention become apparent from the following specification and claims in connection with the appended drawings.

BRIEF DESCRIPTION OF THE DRAWINGS

FIG. 4 is a side elevational view of a spacer of the present invention.

FIG. 5 is a cross-section along line 5—5 of FIG. 4.

FIG. 6 is a plan view of a dog of the present invention.

DESCRIPTION OF THE PREFERRED EMBODIMENTS

Figure 1:
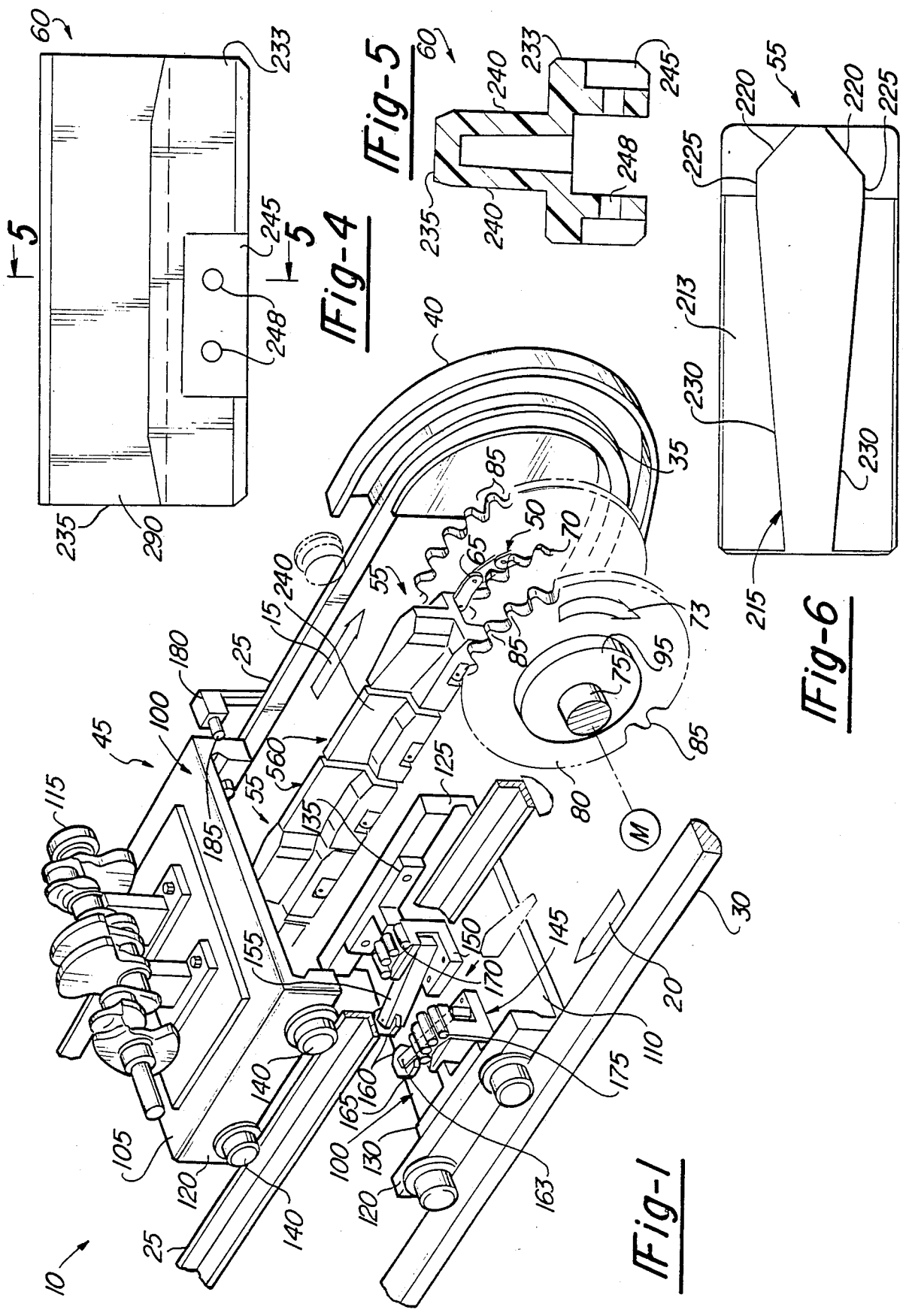
FIG. 1 is a perspective view of the present invention.

Referring now to FIG. 1 of the drawings, conveyor 10 is seen generally without is associated housing. Conveyor 10 provides conveyance through drive course 15 in the direction of the arrow and then through return course 20, the direction of which is also indicated with an arrow. Conveyor 10 includes carrier attachments or drive course pallet tracks 25 and return course pallet tracks 30 which are connected by turn tracks 35. Only one return course pallet track 30 and turn track 35 are shown for simplicity. Turn track 35 is semienclosed by channel guide 40 such that in operation pallet 45 can move along turn track 35 without falling off.

An endless propelling means or endless chain 50 is provided to which a plurality of dogs 55 are attached. Also attached to endless chain 50 and interposed between each of dogs 55 are spacers 60. Both dogs 55 and spacers 60 are attached to chain links 65 of endless chain 50 in the same manner. Endless chain 50 is propelled by drive sprocket 70 which is partially shown in FIG. 1. Endless chain 50 engages drive sprocket 20 through turn course 73, the direction of which is again indicated with an arrow. Drive sprocket 70 is mounted on rotating axle 75 along with pallet sprockets 80 and 85. Pallet sprockets 80 and 85 are provided with a plurality of teeth 90, only a few of which are shown for simplicity. Axle 75 and pallet sprockets 80 and 85 are all rigidly attached to axle 75 such that rotation of axle 75 by motor M produces a corresponding rotation of pallet sprockets 80 and 85. Pallet sprockets 80 and 85 are retained on axle 75 in a conventional wheel and axle arrangement which may include sprocket retainer 95.

Pallet 45 includes pallet slab 100 having principal surface 105 and underside 110. Workpiece 115, here, a crankshaft, is shown disposed on principal surface 105 of pallet slab 100. Pallet slab 100 is supported by pallet sidewalls 120 and 125 which are connected to pallet slab 100 by connectors 130 and 135. Each pallet 100 is provided with pallet wheels 140, two of which are shown in FIG. 1 in conventional rotatable attachment to pallet sidewall 120. As illustrated, pallet wheels 140 ride and rotate on a drive course pallet track 25 to turn track 35, where they are partially enclosed by channel guide 40, and onto return course pallet track 30. Hence, in operation, it will be understood pallet 45 moves through a vertical loop.

Mounted on each pallet underside 110 is roller assembly 145 which includes roller assembly housings 150 in each of which there is pivotally mounted on a roller arm 155. At the free end of each roller arm 155, a roller 160 is attached, with a roller spindle 163, such that each roller can freely rotate around the spindle axis. It may be suitable to provide roller 160 in rigid attachment to spindle 163 such that each roller 160 does not rotate on each spindle 163. Each roller 160 is provided with a plurality of flats 165 such that rollers 160 are octagonal. A plurality of flats 165 which define some other shape such as an hexagon or the like may be suitable. Each roller assembly housing 150 includes hemispherical pin mount portion 170 on which a section of chain or a plurality of pins 125 are rigidly attached.

Conveyor 10 further includes retractable pallet stop 180 having pallet stop pistion 185. In operation, retractable pallet stop 180 is actuated such that stop piston 185 moves into the path of pallet 45 at a predetermined time to stop the forward movement of pallet 45 through drive course 15.

Figure 2:
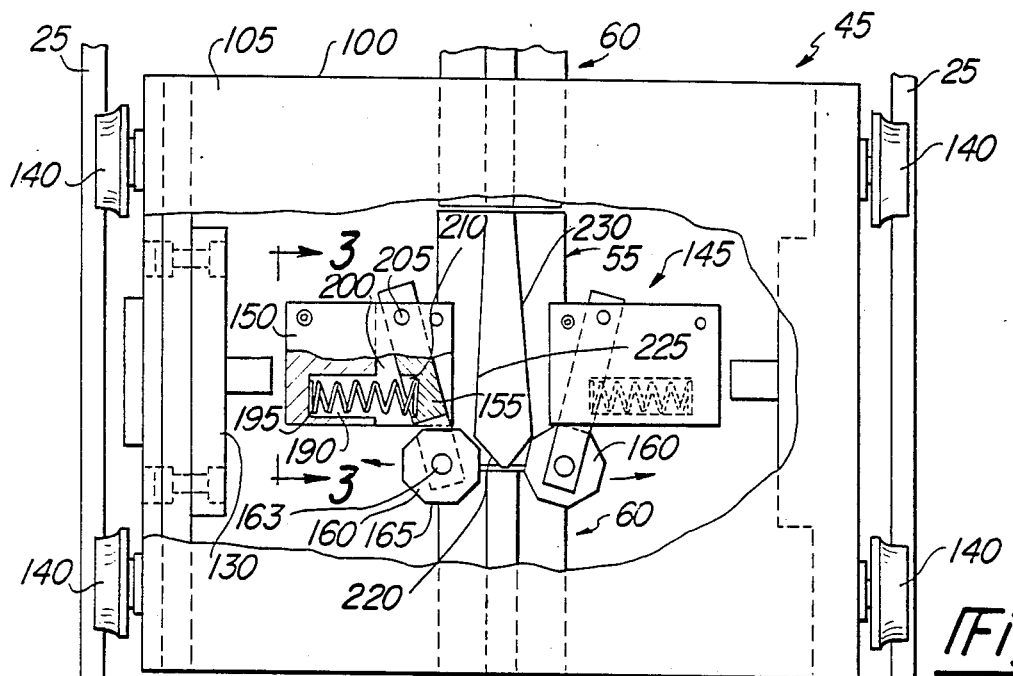
FIG. 2 is a plan view of a portion of the present invention with the pallet partially broken away.

Referring now to FIG. 2 of the drawings, pallet 45 is shown with pallet slab 100 partially removed. Roller assemblies 145 are seen, one of which is also cut away so that spring-receiving cavity 190 in roller assembly housing 150 is visible. Positioned in each spring-receiving cavity 190 is a spring 195 which biases each roller arm 155. Other biasing means may be desirable in some applications. Pivot space 200 is also provide in which roller arm 155 resides, one end of which is pivotally attached to roller assembly housing 150 with pivot pin 205. One end of spring 195 is in contact with roller assembly housing 150, and the other end is in contact with roller arm 55 at roller arm recess 210. Therefore, by the action of spring 195, the opposed rollers 160 are spring-biased toward one another. The pivotal connection of roller arm 55 to roller assembly housing 150 and the biasing strength of each spring 195 are such that, in operation, rollers 160 can sequentially, forcibly engage both dogs 55 and spacers 60. However, the biasing strength of springs 195 is small enough to allow rollers 160 to move apart from each other in response to a predetermined force, as will be explained more fully.

Referring now to FIGS. 2 and 6, dogs 55 are shown in more detail and include body portion 213 to which roller-engaging wedge projection 215 is attached. As seen best in FIG. 6, roller-engaging wedge projection 215 includes forward roller-engaging surface 220, lateral roller-engaging surfaces 225 and tapered roller-engaging surfaces 230. Also in FIG. 2, one dog 55 is shown cut away so that its attachment to chain link 65 is clearly depicted. As stated, the attachment of each dog 55 and each spacer 60 to endless chain 50 is essentially the same. As seen in FIGS. 4 and 5, each spacer 60 includes body 233 with roller-engaging projection 235 having roller-engaging surfaces 240. Both dogs 55 and spacers 60 are also provided with depressions 245 and a plurality of holes or bores 248. As illustrated best in the cutaway view of dog 55 in FIG. 2, plates 250, having holes corresponding to bores 248, are placed in depressions 245 such that the holes in plates 250 are aligned with bores 248. Connecting pins 255 are then inserted through the holes in plate 250 and bores 248 to connect dogs 55 to chain link 65 of endless chain 50. Although as illustrated, connecting pins 255 extend completely through chain link 65 and dog 55, other arrangements for connecting dogs 55 and spacers 60 to endless chain 50 may be suitable.

Referring now to FIGS. 1 and 2, in the method of the present invention, a pallet 45 is positioned on drive source pallet track 25 such that pallet wheels 140 ride and rotate on drive course pallet track 25. In this position, rollers 160 engage either one of dogs 55 or one of spacers 60, depending on the position at which pallet 45 is initially placed on drive course pallet track 25. For the purpose of this explanation, it will be presumed that pallet 45 is initially positioned such that rollers 160 engage roller-engaging projection 235 of a spacer 60. That is, pallet 45 is positioned so that one of spacers 60 is positioned between rollers 160 with one flat 165 of each roller 160 in contact with one of roller-engaging surfaces 240. Flat 165 provides greater surface area than a circular roller configuration. Springs 195 bias each roller arm 155, and thus each roller 160 exerts a force on roller-engaging projection 235.

When conveyor 10 is activated, endless chain 50 is drawn through its course by drive sprocket 70. Due to their described attachment, dogs 55 and spacer 60 move with endless chain 50 in the direction of drive course 15. The frictional force of each of flats 165 of each roller 160 exerted on roller-engaging surfaces 240 is determined by the biasing force of springs 195 and the relative placement of each roller arm 155 in each pivot space 200. Each roller arm 155 is positioned in pivot space 200 such that each roller arm 155 can pivot toward one another such that the space between the opposed rollers 160 is less than the width of dogs 55 and spacers 60 at any point. In other words, there must be sufficient clearance in pivot space 200 to allow roller arms 150 to pivot the required distance to bring rollers 160 toward one another the required distance. Rollers 160 are biased respectively by springs 195 such that each flat 165 which is in contact with either a dog 55 or a spacer 60 exerts a frictional force having a magnitude such that pallet 45 is propelled by a spacer in the direction of drive course 15 when pallet 45 is loaded with a workpiece. That is, when rollers 160 are in engagement with a spacer 60, the frictional force provided between rollers 160 and roller-engaging projection 235 of spacer 60 is sufficient to move pallet 45 through the drive course at the speed of spacer 60. The magnitude of the biasing force is also such that when rollers 160 are in engagement with roller-engaging projection 235 of spacer 60 and pallet 45 is not loaded with a workpiece, pallet 45 is propelled by spacer 60. That is, the downward force of the loaded pallet 45 overcomes the forward movement imparted by the movement of spacer 60. Thus, flat 165 of each roller 160 frictionally engages, but slides along, roller-engaging surfaces 240 when the pallet is loaded with a workpiece. Although this frictional force between the rollers and the spacers is insufficient to propel the loaded pallet 45 forward through the drive course, the force is sufficient to prevent any lateral or rearward movement of the loaded pallet 45 during operation.

When the rollers 160 reach the rearward end of spacer 60, each roller 160 engages forward roller-engaging surfaces 220 of roller-engaging wedge projection 215 of dog 55. The width of roller-engaging wedge projection 215 at forward roller-engaging surfaces 220 in combination with the bias provided by springs 195 is sufficient to cause rollers 160 to engage forward roller-engaging surfaces 220 whereby pallet 45 is caught by dog 55 and is carried along in this position at the speed of endless chain 50. Thus, pallet 45 is carried along securely by dog 55.

Referring again to FIG. 1 of the drawings, pallet 45 in engagement with one of dogs 55 moves through drive course 15 until it reaches a work station where the forward movement of pallet 45 and thus workpiece 115 is stopped using retractable pallet stop 180. In this embodiment, retractable pallet stop 180 is provided with a stop piston 185 which may be extended into the path of pallet 45. Any similar method of stopping the forward movement of pallet 45 would be acceptable for use in the present invention. Retractable pallet stop 180 may be controlled with a microprocessor. As pallet 45 comes in contact with stop piston 185, rollers 160 spread apart slightly in response to the continued movement of dog 55 such that flats 165 of rollers 160 move from their position of engagement with forward roller-engaging surfaces 220 to a position at which flats 160 engage lateral roller-engaging surfaces 225. In that embodiment of the present invention wherein rollers 160 are rotatably mounted on each roller arm 155, the movement of rollers 160 from forward roller-engaging surfaces 220 to lateral roller-engaging surfaces 225 is as follows. Each roller 160 rotates the distance of one flat 165. Thus, each roller 160 "rolls over" the intersection of forward roller-engaging surfaces 220 and lateral roller-engaging surfaces 225. For example, if flats 165 of each roller 160 form an octagon as depicted clearly in FIG. 2, each roller rotates one-eighth of its circumference. This feature prevents the intersection of these surfaces of dogs 55 from becoming worn down, which would otherwise occur if rollers 160 were non-rotatable. Hence, since the forward movement of pallet 45 is still impeded by stop piston 185, the engagement of rollers 160 changes from lateral roller-engaging surfaces 225 to tapered roller-engaging surfaces 230 of roller-engaging wedge projection 215. The constant biasing force provided by springs 195 and the pivotal nature of roller arms 155 thus allow rollers 160 to attain several positions, all of which are in engagement with dogs 55 or spacers 60.

As endless chain 50 continues to move, with pallet 45 stopped by retractable pallet stop 180, rollers 160 continue to slidingly engage tapered rollerengaging surfaces 230 of dog 55. Once rollers 160 reach the end of dog 55, they move to and slidingly engage the following spacer 60 in the manner previously described. There may be several spacers 60 between dogs 55, and thus the sliding engagement of rollers 160 on spacers 60 may continue from spacer to spacer until the next dog 55 moves into position. If the forward movement of pallet 45 is still impeded by retractable stop 180, the next dog 55 which comes by causes rollers 160 to first engage forward roller-engaging surfaces 220 of dog 55, and then rotate one flat to engage lateral roller-engaging surface 225 and then slide onto tapered roller-engaging surface 230. Again, this rotation of a single flat prevents premature wear of dogs 55. The sequency of relative movement continues from each dog 55 to intervening spacers 60 to the next dog 55 and so on.

By arranging and biasing rollers 160 so that they exert a constant force on both dogs 55 and on spacers 60, pallet 45 is subjected to a constant forward force in the direction of drive course 15. This constant forward force holds pallet 45 rigidly against stop piston 185. It is also been found that when pallet 45 makes its initial contact with stop piston 185, this constant forward force also prevents pallet 45 from bouncing back when it hits stop piston 185, a significant problem with prior art conveyors. Lateral movement of pallet 45 on spacers 60 is also eliminated. Since there is no rearward movement of pallet 45 caused by its impact with stop piston 185, a rearward stop positioned at the rearward end of pallet 45 is no longer needed. Moreover, by providing a constant force between rollers 160 and roller-engaging projections 235 of spacers 60, as stated, lateral movement of pallet 45 as spacers 60 pass between rollers 160 is eliminated. This lateral movement is a significant problem in conventional conveyors. Of course, if more than one pallet 45 is in motion through drive course 15, stopping one pallet 45 causes subsequent pallets 45 to stop or accumulate in the manner described.

Once the operation at a work station has been completed, stop piston 185 of retractable pallet stop 180 is retracted. Rollers 160 then slide along spacer 60 in the manner described until they engage the forward roller-engaging surfaces 220 of the next dog 55. Pallet 45 is then once again carried along by dog 55. By providing flats 165 on rollers 160, greater surface area and thus better engagement between rollers 160 and the engaging surfaces of either dogs 55 and spacers 60 is achieved.

Figure 3:
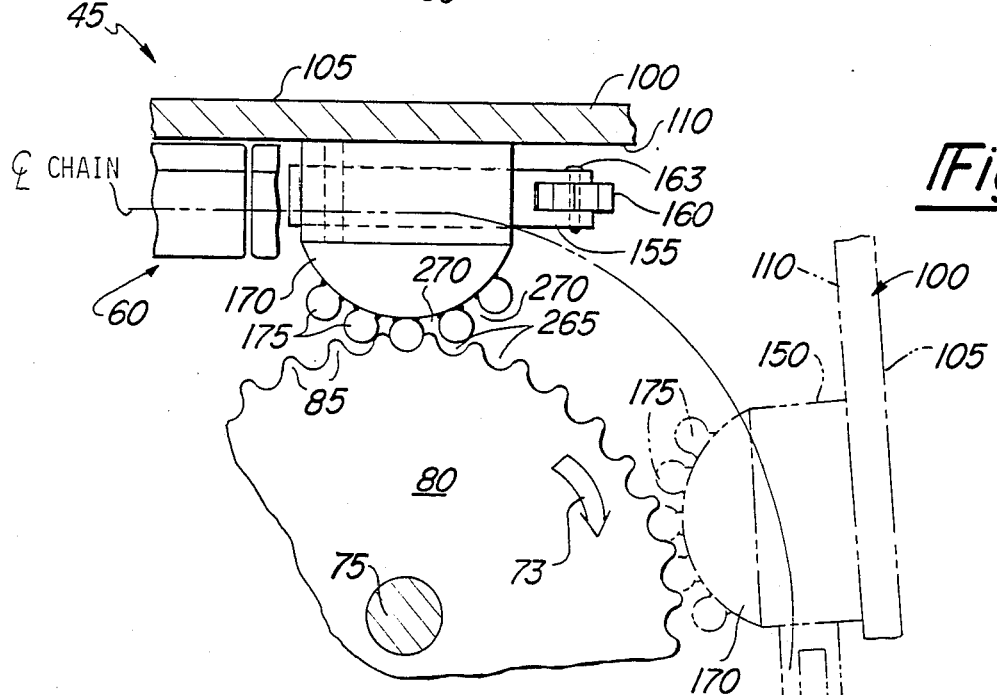
FIG. 3 is a side elevational view of a portion of the pallet and pallet sprocket of the present invention with the pallet being shown in two positions.

Referring now to FIGS. 1 and 3, as pallet 45 reaches turn track 35, pallet wheels 140 enter channel guides 40 which prevent pallet 45 from falling off turn track 35. Due to the configuration of pallet 45, roller assemblies 145 and track turn 35, pallet 45 is not propelled by dogs 55 completely through turn course 73. Movement of pallet 45 through turn course 73 in the present invention is achieved in one aspect by providing pallet sprockets 80 and 85 and pins 75 which are attached to hemispherical pin mounts 170 on each roller assembly housing 150. Referring now to FIG. 3 of the drawings, as pallet 45 reaches turn course 73, teeth 90 of pallet sprockets 80 and 85 engage or mesh with pins 175 such that each pin 175 fits within one notch 265 of pallet sprockets 80 and 85. Similarly, each tooth 90 of pallet sprockets 80 and 85 is received within teethreceiving spaces 270 which are defined between pins 70. Pallet 45 is carried in this manner by pallet sprockets 80 and 85 through turn course 73 to return course pallet track 30 as shown in FIG. 1. Dog 55 then moves pallet 45 through return course 20 in the same manner which was described in relation to the movement of pallet 45 through drive course 15. At the end of conveyor 10 opposite that of turn course 73 the second turn course (not shown) is provided with associated pallet sprockets, turn track and channel guides by which the pallet 45 is propelled back up to drive course 15. Pallet 45 is carried through the second turn course by pallet sprockets in the manner described for the movement of pallets through turn course 73. By providing pallet sprockets 80 and 85 and pins 175 on roller assemblies 145, when pallet 45 reaches the end of drive course 15, it is immediately carried through turn course 73. Thus, the delay caused when a pallet must wait for one of two drive spindles, as in prior art conveyors, is eliminated.

Figure 7:
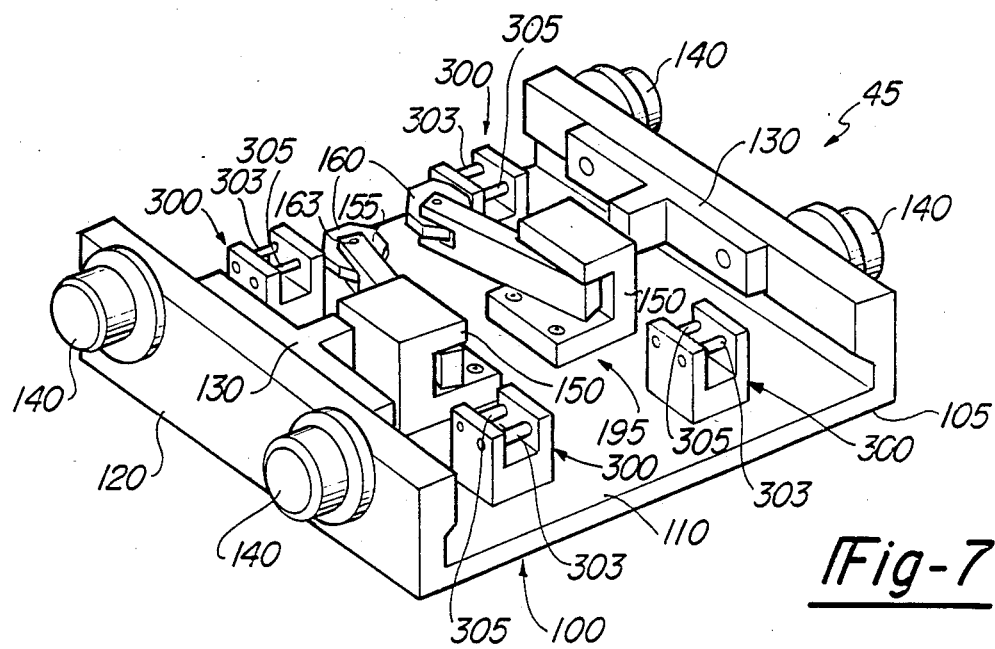
FIG. 7 is a perspective view of the underside of a pallet of he present invention in an alternate embodiment.
Figure 8:
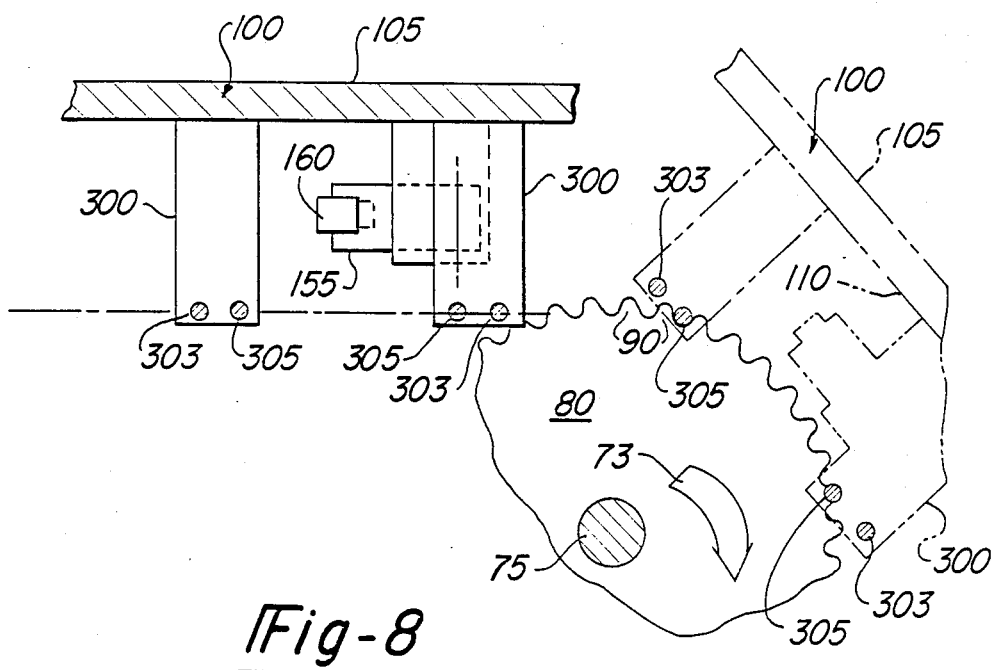
FIG. 8 illustrates the cooperation of the pallet of FIG. 7 with the pallet sprocket in the present invention.

In another aspect, and referring now to FIGS. 7 and 8 of the drawings, an alternate arrangement and method of propelling pallet 45 through turn course 73 is provided which includes four pin-housings 300 attached to the underside of pallet 45. Each pin-housing 300 includes two pins 303 and 305. One pin-housing 300 is positioned at each corner of pallet 45. Pin housings 300 and pins 305 and 303 are positioned and spaced such that they register with pallet sprockets 80 and 85, one of which is shown in FIG. 8. As pallet 45 reaches the end of the drive course or alternatively the end of the return course, pins 303 and 305 are engaged by teeth 90, as best shown in FIG. 8, whereby pallet 45 is carried onto sprocket 80 and is propelled through the turn course.

I claim:

1. An accumulating pallet chain-dog conveyor comprising:
   a carrier attachment defining a conveyor course;
   a pallet adapted to be propelled on said carrier attachment through said conveyor course;
   a pallet stop for halting the movement of said pallet through said conveyor course;
   an endless propelling means associated with said carrier attachment for propelling said pallet through a portion of conveyor course;
   a generally wedge-shaped dog connected to said endless propelling means;
   a spacer attached to said endless propelling means;
   two pivoting arms attached to the underside of said pallet;
   two horizontally opposed rollers for sequentially engaging said dog and said spacer during movement of said endless propelling means and defining a space between said rollers, said rollers each having at least one flat surface for said sequential engagement of said dog and said spacer and one of said rollers being attached to one of said pivoting arms and the other of said rollers being attached to the other of said pivoting arms;

first biasing means in operative relation to said one of said pivoting arms;

second biasing means in operative relation to said other of said pivoting arms, said first and second biasing means for biasing said rollers toward one another such that said dog and said spacer are sequentially, substantially, continuously engaging by said flat surfaces of said rollers;

whereby said rollers engage said dog during operation of said conveyor to propel said pallet through said conveyor course until the movement of said pallet is halted by said pallet stop at which time said biased rollers allow said dog to move through said space, said flats of said rollers being in sliding frictional contact with said dog, whereupon said spacer moves through said space in sliding, frictional contact with said flats of said rollers, imparting a stabilizing force on said pallet.

2. The accumulating pallet chain-dog conveyor recited in claim 1, wherein said rollers are rotatably mounted to said pivoting arms.

3. The accumulating pallet chain-dog conveyor recited in claim 1, wherein said first and second biasing means each include a spring contacting said pivoting arms.

4. The accumulating pallet chain-dog conveyor recited in claim 1, wherein said endless propelling means includes and endless chain to which said dog and said spacer are attached.

5. The accumulating pallet chain-dog conveyor recited in claim 1, wherein said rollers are hexagonal in shape.

6. The accumulating pallet chain-dog conveyor recited in claim 1, wherein said rollers are octagonal in shape.

7. The accumulating pallet chain-dog conveyor recited in claim 1, wherein said carrier attachment is a track and wherein said pallet includes wheels.

8. The accumulating pallet chain-dog conveyor recited in claim 1, wherein said conveyor course includes a vertical turn course and further including a rotating pallet-propelling sprocket assembly for propelling said pallet through said turn course, and a pin assembly mounted on the underside of said pallet, said pin assembly and said sprocket assembly being adapted to mesh with one another such that said pallet is propelled by said sprocket assembly through said turn course.

9. The accumulating pallet chain-dog conveyor recited in claim 8, further including a first housing attached to the underside of said pallet for housing a portion of said one of said pivoting arms, said first housing having a pinmount portion, and a second housing attached to the underside of said pallet for housing a portion of said second of said pivoting arms, said second housing having a pin-mount portion, and wherein said pin assembly includes at least two pins mounted on the pin-mount portion of said first housing and at least two pins mounted on the pin-mount portion of said second housing and wherein said sprocket assembly includes first and second sprockets such that as said pallet reaches said turn course portion of said conveyor course said first and second sprockets mesh with said pins on said first and second housings whereby said pallet is propelled through said turn course.

10. The accumulating pallet chain-dog conveyor recited in claim 8, further including four pin-housings attached to the underside of said pallet, and wherein said sprocket assembly includes two sprockets and wherein said pin assembly includes at least two pins mounted on each of said pin-housings, the relative positions of said pin-housings and said sprockets being such that as said pallet moves to the beginning of said turn course, said sprockets engage said pins to propel said pallet through said turn course.

11. A method of conveyance employing the following:

a conveyor having a carrier attachment defining a conveyor course;

a pallet adapted to be propelled on said carrier attachment through said conveyor course;

a pallet stop for halting the movement of said pallet through said conveyor course;

and endless propelling means associated with said carrier attachment for propelling said pallet through a portion of said conveyor course;

a generally wedge-shaped dog connected to said endless propelling means;

a spacer attached to said endless propelling means;

two pivoting arms attached to the underside of said pallet;

two horizontally opposed rollers for sequentially engaging said dog and said spacer during movement of said endless propelling means and defining a space between said rollers, said rollers each having at least one flat surface for said sequential engagement of said dog and said spacer and one of said rollers being attached to one of said pivoting arms and the other of said rollers being attached to the other of said pivoting arms;

first biasing means in operative relation to said one of said pivoting arms; and second biasing means in operative relation to said other of said pivoting arms, said first and second biasing means for biasing said rollers toward one another such that said dog and said spacer are sequentially, substantially, continuously engaging by said flat surfaces of said rollers;

said method comprising the steps of:

propelling said pallet at least partially through said conveyor course by engaging said dog with said rollers whereby said pallet is propelled along said carrier attachment;

stopping the movement of said pallet through said conveyor course using said pallet stop, whereby said rollers slidingly frictionally engage said dog and subsequently said spacer to stabilize said pallet to prevent rearward and lateral movement of said pallet on said carrier attachment.

* * * * *